United States Patent [19]
Chan et al.

[11] Patent Number: 5,650,932
[45] Date of Patent: Jul. 22, 1997

[54] SPLITTER SECTION ENGAGEMENT CONTROL

[75] Inventors: Kwok Wah Chan, Chorley; Anthony Stasik, Coppull, both of England

[73] Assignee: Eaton Corporation, Cleveland, Ohio

[21] Appl. No.: 424,694

[22] Filed: Apr. 19, 1995

[30] Foreign Application Priority Data

Jun. 25, 1994 [GB] United Kingdom ............... 9412809

[51] Int. Cl.⁶ ............................................. B60K 41/08
[52] U.S. Cl. .......................... 364/424.091; 364/424.093; 477/115; 477/908
[58] Field of Search .................... 364/424.1, 424.08, 364/424.091, 424.093; 74/335; 477/115, 124, 908

[56] References Cited

U.S. PATENT DOCUMENTS

| | | | |
|---|---|---|---|
| Re. 32,591 | 2/1988 | Richards | 74/866 |
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 74/866 |
| 4,735,109 | 4/1988 | Richards | 74/745 |
| 5,109,721 | 5/1992 | Boardman et al. | 74/336 |
| 5,157,607 | 10/1992 | Stainton et al. | 364/424.1 |
| 5,329,826 | 7/1994 | Graves, Jr. et al. | 74/335 |
| 5,385,515 | 1/1995 | Chan et al. | 477/75 |
| 5,409,432 | 4/1995 | Steeby | 364/424.1 X |
| 5,441,462 | 8/1995 | Chan | 477/74 |
| 5,444,623 | 8/1995 | Genise | 364/424.1 |
| 5,508,916 | 4/1996 | Markyvech et al. | 364/424.1 |
| 5,509,867 | 4/1996 | Genise | 477/120 |
| 5,533,946 | 7/1996 | Markyvech | 477/78 |
| 5,537,894 | 7/1996 | Chan | 74/745 |

*Primary Examiner*—Collin W. Park
*Attorney, Agent, or Firm*—Howard D. Gordon

[57] ABSTRACT

A control system/method for an automated transmission system including a splitter-type, semi-blocked mechanical transmission (12) is provided. The control provides a technique for sensing and rapidly recovering from a blocker (324) hang-up fault in the transmission auxiliary section (214).

7 Claims, 7 Drawing Sheets

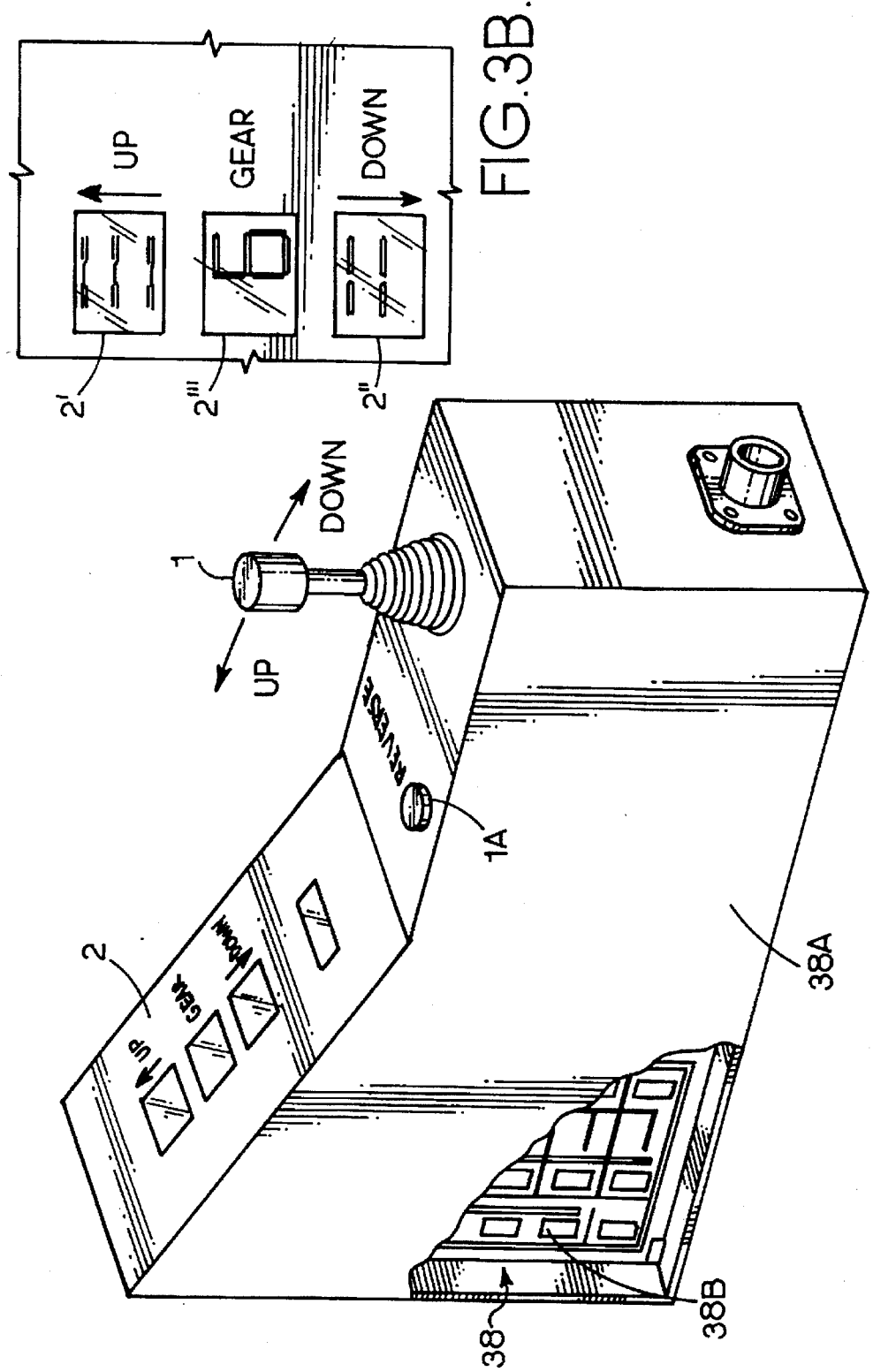

5,650,932

SPLITTER SECTION ENGAGEMENT CONTROL

BACKGROUND OF THE INVENTION

1. Related Applications

This application claims priority from GB 9412809.7, filed Jun. 25, 1994.

This application is related to U.S. Ser. No. 08/425,021, entitled ENGAGEMENT FAULT DEGRADED MODE CONTROL, now U.S. Pat. No. 5,539,894, filed the same date, Apr. 19, 1995, and assigned to the same assignee, EATON CORPORATION, as is this application.

2. Field of Invention

The present invention relates to a control method and control system for shifting a compound semi-blocked, splitter-type automatic or semi-automatic transmission system. Automatic and semi-automatic mechanical transmission systems are known in the prior art and illustrated in U.S. Pat. Nos. 4,361,060 and 4,648,290, the disclosures of which are hereby incorporated by reference. Semi-blocked compound transmissions of the splitter type are known in the prior art and illustrated in U.S. Pat. Nos. 3,924,484; 4,735, 109 and 4,736,643, the disclosures of which are hereby incorporated by reference.

In particular, the present invention relates to a shift control method/system for an automated compound semi-blocked mechanical transmission system wherein, upon sensing that the main section is engaged in the desired ratio thereof and that a known ratio has not engaged, the initial recovery response is a sequence of operations undertaken to cause a blocked splitter clutch assembly to unblock, allowing engagement of the splitter section ratio associated with the target ratio. If the initial response does not successfully cause engagement of the target ratio, then other fault detection and degraded mode routines are undertaken.

3. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear automated mechanical transmissions utilizing electronic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 4,569,255; 4,576,065; 4,595,986; and 4,576,263, the disclosures of which are hereby incorporated by reference.

Semi-automatic mechanical transmission controls wherein automatic changing between a plurality of gear ratios is provided while normally permitting the driver to choose when to make a particular gear ratio change, whether to select the immediately consecutive ratio up or down or to skip one or more ratios, and when to slip (i.e., to incompletely engage) the vehicle master clutch in a lower crawler gear, are known. Furthermore, the semi-automatic control system prohibits engagement of a driver-selected higher ratio (i.e., an upshift) that would cause the engine speed to decrease below the idle speed (i.e., would cause stalling and/or over-stressing at low speeds of the engine) and of a lower ratio (i.e., a downshift) if such a change would cause overspeeding of the engine. Examples of such a semi-automatic transmission control can be seen by reference to above-mentioned U.S. Pat. No. 4,648,290.

A control method for shifting automatic and semi-automatic mechanical transmissions (called "AMTs") including semi-blocked, splitter-type compound transmissions wherein each shift, both simple (auxiliary section only) and compound (main and auxiliary section), involves shifting of the main transmission section to neutral to allow shifting of the blocked auxiliary section without requiring a crossing of synchronous of the preselected jaw clutch members, is disclosed in U.S. Pat. No. RE 32,591, the disclosure of which is hereby incorporated by reference.

While the aforementioned, automatic, semi-blocked transmission systems and controls therefor are generally satisfactory, in certain situations, the target gear ratio did not engage and, thus, it is desirable to provide an engagement fault detection technique and a fault recovery mode and/or fault degraded mode of operation.

SUMMARY OF THE INVENTION

In accordance with the present invention, a shift control system/method for an automated splitter-type, semi-blocked transmission system of the type shifted to main section neutral during each ratio change is provided which will sense apparent splitter section engagement faults and, upon sensing such a fault, will first take corrective action to cause engagement of a blocked splitter section shift and then, if engagement of the target ratio is not sensed, will adapt an engagement fault degraded mode of operation.

Accordingly, it is an object of the present invention to provide a new and improved control system and control method for shifting a compound semi-blocked, splitter-type automated mechanical transmission of the type shifted to main section neutral during each ratio change.

This and other objects and advantageous of the present invention will become apparent from a reading of the detailed description of the preferred embodiment taken in connection with the attached drawings.

BRIEF DESCRIPTION OF THE DRAWINGS

FIGS. 3 and 3B illustrate the control and display console of the system illustrated in FIG. 1.

DESCRIPTION OF THE PREFERRED EMBODIMENT

Figure 1:
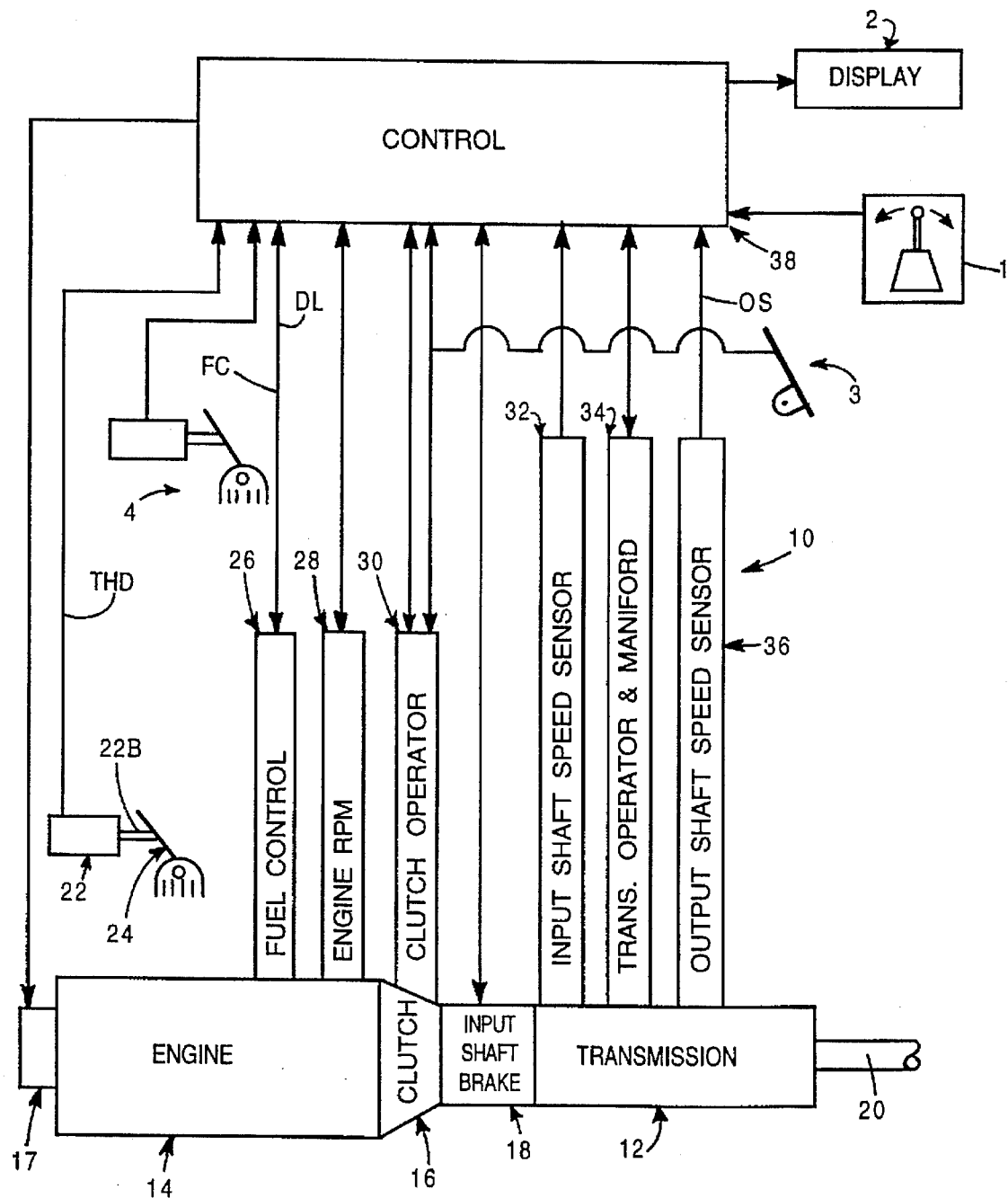
FIG. 1 is a symbolic illustration of a splitter-type, semi-blocked automatic/semi-automatic mechanical transmission system.

In the present description of the preferred embodiment, certain terminology will be used for descriptive purposes only and is not intended to be limiting. The terms "upward," "downward," "rightward" and "leftward" will refer to directions in the drawings to which reference is made. The terms "inward" and "outward" refer to directions towards and away from, respectively, the geometric center of the device, or portion thereof, being described. The above applies to derivatives of the terms above specifically mentioned, and terms of similar import.

The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, and European Pat. No. 0,070,353, the disclosures of all of which are hereby incorporated by reference.

The automatic or the semi-automatic control system of the present invention is particularly advantageously applied to a splitter-type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in U.S. Pat. Nos. 4,735,109; 4,736,643; 4,930,078 and 5,042,327.

Referring to FIG. 1, the position of a driver-operated throttle 24 is sensed at sensor 22 and a signal indicative thereof (THD) fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that engine speed is an indication of transmission input shaft speed, and visa versa, especially if clutch 16 is nonslippingly engaged, while transmission output shaft speed is an indication of vehicle speed.

Figure 2:
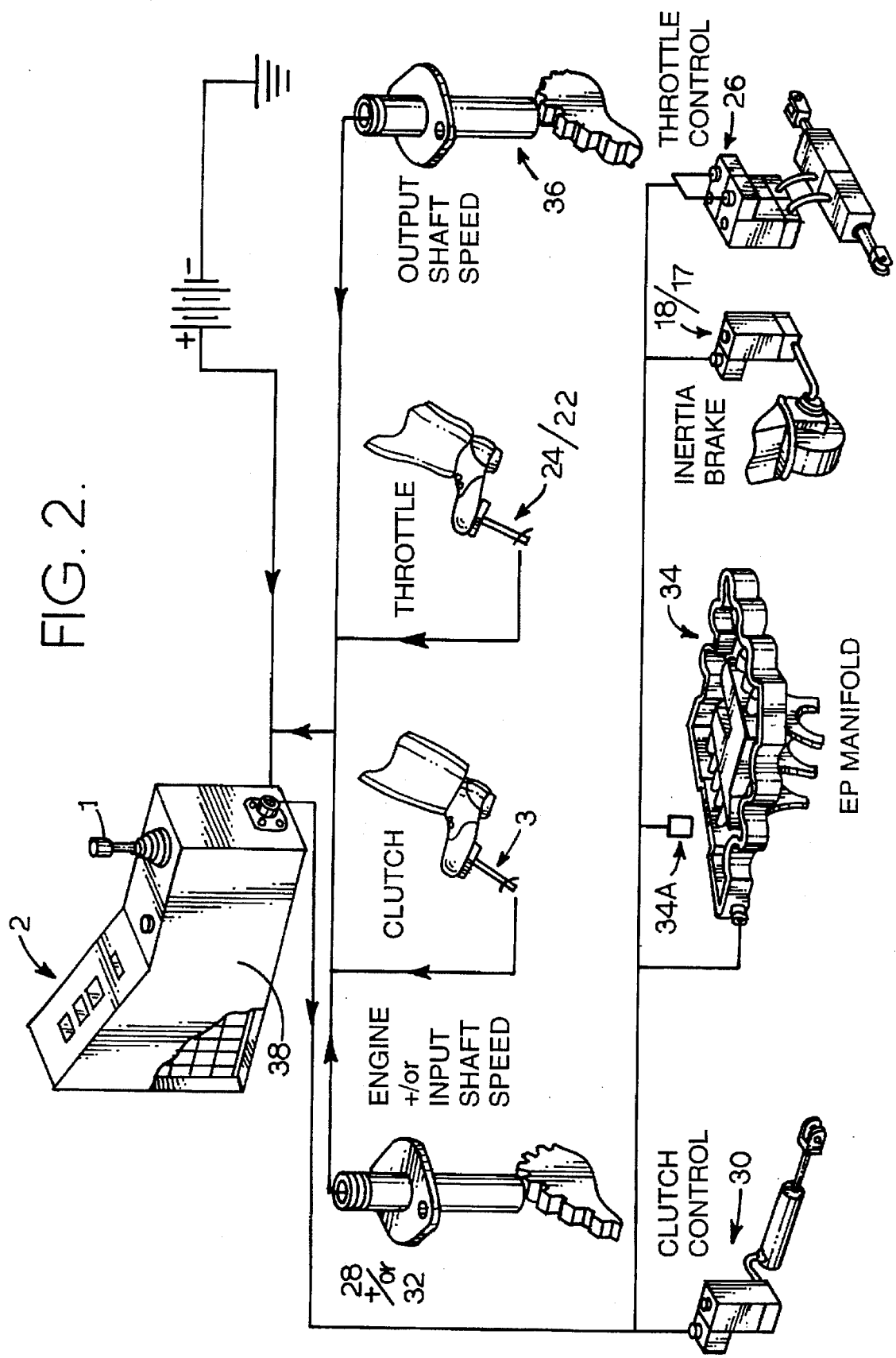
FIG. 2 is a symbolic illustration of control members and sensors of the system illustrated in FIG. 1.

Control logic circuits, sensors, and actuators for the transmission system 10 as disclosed in FIGS. 1 and 2, may be as disclosed in aforementioned U.S. Pat. Nos. 4,361,060 and 4,595,986. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" or "dip" the supply of fuel to the engine 14 to achieve rapid synchronous rotation preparatory to a shift, clutch control via operator 30, and ratio shifting via transmission operator 34.

The central processing unit also sends command output signals to the display 2 to be described in greater detail below. The automatic/semi-automatic transmission system 10 may additionally comprise a usual foot-operated manual clutch control 3 intended for use only for start from rest and/or low speed creeping maneuvering situations. The control 38 receives signals indicative of manual clutch control 3 position and of actuation of the vehicle brakes 4. The automatic/semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24. The engine may be electronically controlled and may communicate with the controller 38 over an electronic datalink (DL) of the type conforming to the SAE J1922, SAE J1939 and/or CAN protocols.

As may be seen by reference to FIG. 3, the central processing unit 38 may be contained in a box or housing 38A, which housing carries the display panel 2 having an upshift indicator display 2', a downshift indicator display 2" and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3B, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, at a determined or calculated vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear.

Gear shifts are achieved without the operator manually engaging and/or disengaging the master clutch 16 by means of the mechanical manual clutch pedal 3. Manual clutch pedal 3, if provided, is normally only used for starting from rest, reversing or for maneuvering, etc., as vehicle clutches have traditionally been used.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e., seventh and eighth speeds will not be engaged).

The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Although the present invention has been described in terms of a semi-automatic mechanical transmission system, it is equally applicable to fully automated transmission systems.

The transmission operator 34 includes an electro pneumatic ("EP") manifold is preferably broken down into two elements. The first associated with the front box and the second with back box operations. The EP manifold is a manifold controlled by solenoid valves and associated with the cylinders carrying the shift pistons. The main section control may be of the X-Y type as seen in U.S. Pat. No. 4,899,607, the disclosure of which is hereby incorporated by reference. The main section control 34 is provided with sensors 34A whereby the positioning of the shift forks may be sensed to sense the engaged ratio in the main section.

Preferably, transmission 12 is a multi-speed transmission having at least five, preferably nine or more, selectable forward ratios. The structure of a 12-forward-speed, splitter-type transmission 12, and of the blocked jaw clutch members utilized in the auxiliary transmission section of transmission 12, is known in the prior art and may be appreciated in greater detail by reference to above mentioned U.S. Pat. Nos. 3,799,002; 3,921,469; 3,924,848; 4,194,410; 4,440,037; 4,736,643 and 4,735,109.

Figure 4A:
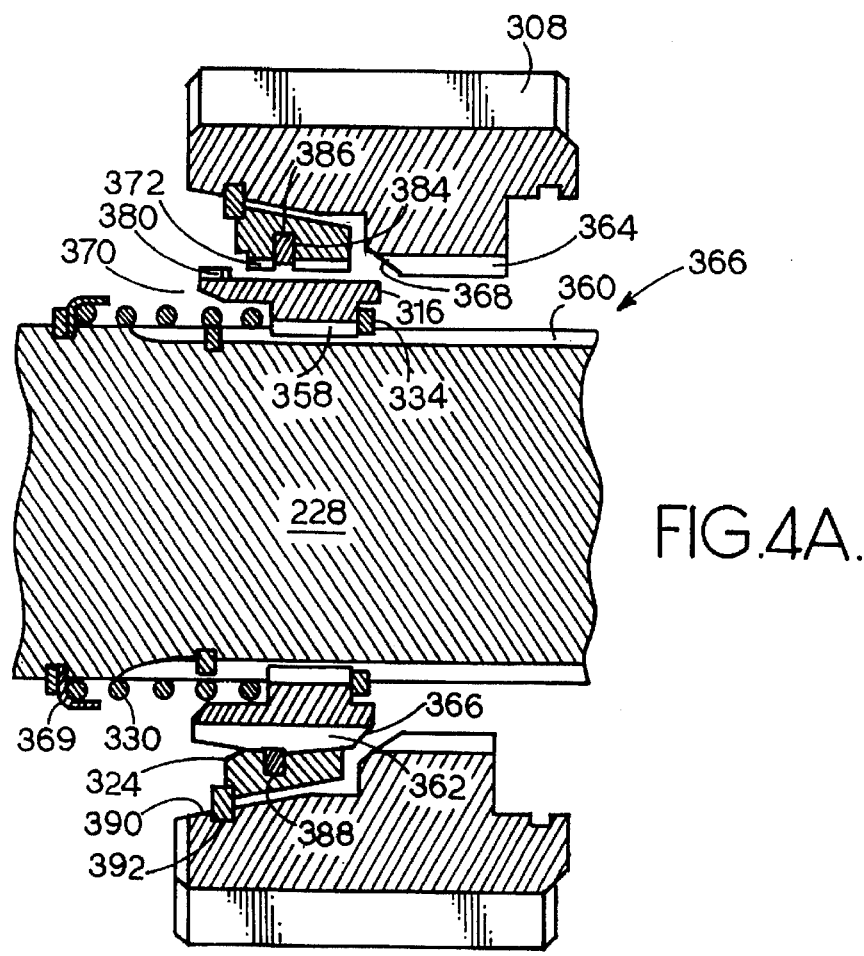
FIGS. 4A–4D are partial views of various components of the transmission of FIG. 4.
Figure 4B:
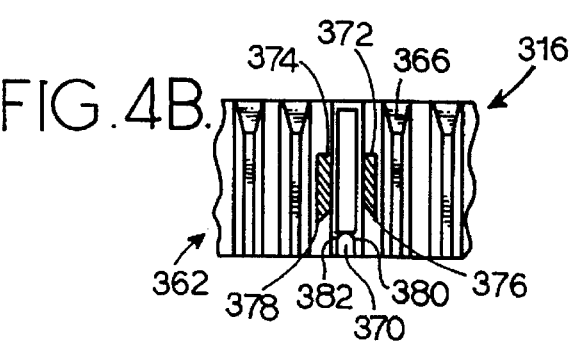
Figure 4C:
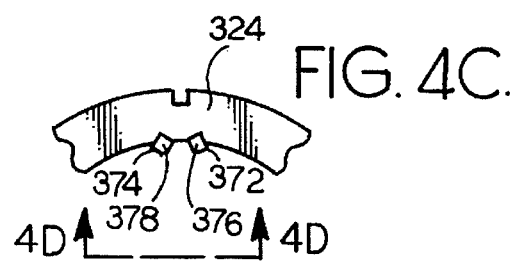
Figure 4D:
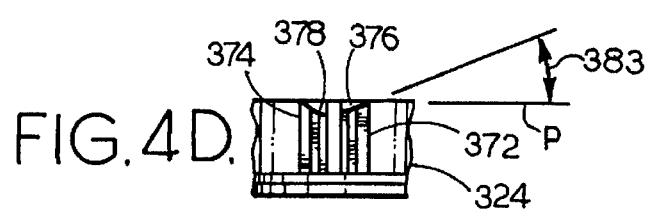
Figure 4:
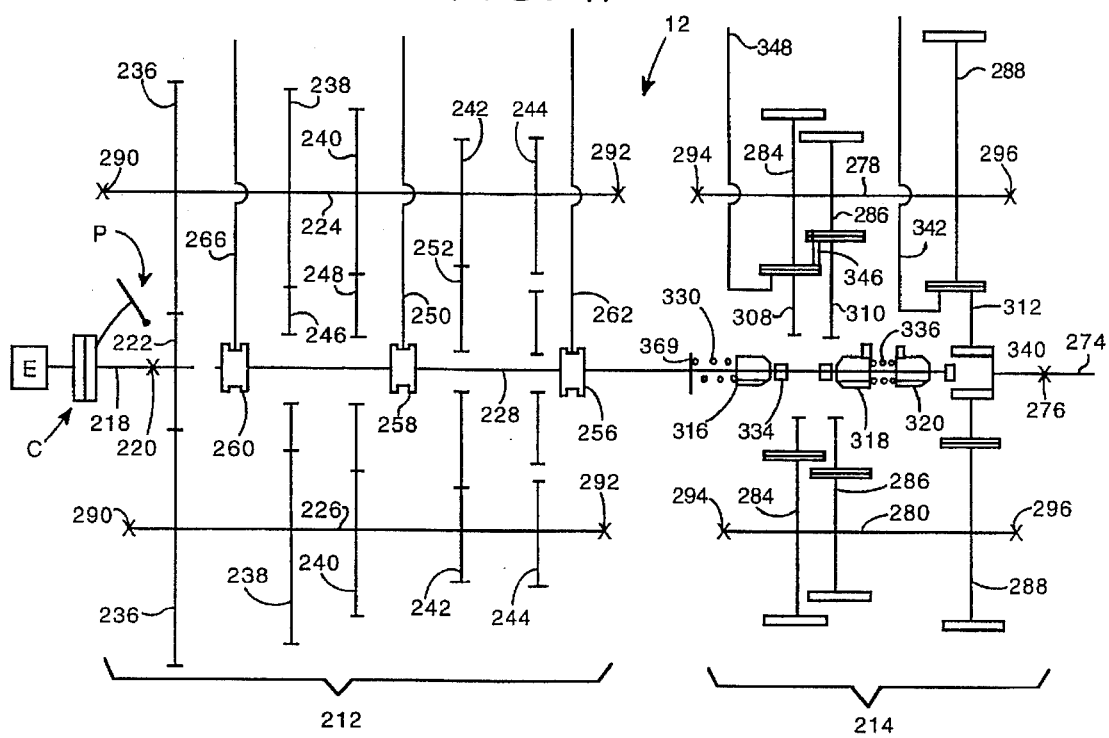
FIG. 4 is a symbolic illustration of a "4×3" 12-speed compound splitter-type, semi-blocked transmission.

Referring to FIG. 4, transmission 12 includes a main section 212 connected in series with a blocked splitter-type auxiliary section 214. The transmission includes an input shaft 218 supported adjacent its rearward end by a bearing 220 and is provided with an input gear 222 nonrotatably connected thereto, as by splines. The input gear 222 simultaneously drives a plurality of main section countershafts at equal speeds. In the illustrated embodiment, the transmission is provided with two main section countershafts, 224 and 226, disposed on diametrically opposite sides of the mainshaft 228, which mainshaft is coaxially aligned with the input shaft 218 and is provided with a pilot portion 230 on its forward end rotatably received within and supported by the rearward end of the input shaft 218.

The input shaft 218 is normally driven in one direction only by a primemover, such as a throttle controlled Diesel engine E through a selectively operated, normally engaged, friction master clutch C.

Each of the main section countershafts 224 and 226 is provided with an identical grouping of countershaft gears, such as the pair of gears 236, of identical size and number of teeth and disposed on diametrically opposite sides of the mainshaft 228.

A plurality of main section mainshaft drive gears 246, 248, 250 and 252 surround the mainshaft 228 and are selectably clutchable thereto, one at a time, by sliding clutch collars as is well known in the art.

The main section mainshaft gears 246, 248 and 250 encircle the mainshaft 228, are in continuous meshing engagement with, and are floatingly supported by the diametrically opposite pairs of countershaft gears, 238, 240 and 242, respectively, which mounting means and the special advantages resulting therefrom are explained in greater detail in U.S. Pat. Nos. 3,105,395 and 3,335,616, the disclosures of which are hereby incorporated by reference. The mainshaft gear 252 is the reverse gear and is in continuous meshing engagement with a pair of countershaft gears 244 by means of conventional intermediate idler gears (not shown). The forwardmost countershaft gears 236 are continually meshed with and driven by the input gear 222 for causing simultaneous rotation of the countershafts 224 and 226 whenever the input shaft is rotatably driven.

Main section mainshaft gears 246, 248, 250 and 252; and main section countershaft gears 236, 238, 240, 242 and 244, and the idler gears, are all constantly meshed with and driven by the input gear 222 and thus, in combination, form the input gearing of the transmission 12.

As may be seen, various abutment rings 254 are provided to axially fix the main section mainshaft gears relative to mainshaft 228.

Sliding clutch collars 256, 258 and 260 are splined to mainshaft 228 for axial movement relative thereto and rotation therewith as is well known in the art.

Sliding clutch 256 is axially slidable by means of shift fork 262 to clutch gear 252 to the mainshaft. Sliding clutch 258 is axially slidable by means of shift fork 264 to clutch either gear 250 or 248 to the mainshaft. Sliding clutch 260 is axially slidable by means of shift fork 264 to clutch gear 246 to the mainshaft or to clutch the input gear 222 (and thus the input shaft 218) to the mainshaft. Shift forks 262, 264 and 266 are attached to shift bars or rails of a known shift bar housing assembly.

Considering now the splitter auxiliary section 214, the mainshaft 228 extends thereinto and is coaxially arranged with and piloted into an output shaft 274 which is in turn supported within the housing 216 by suitable bearings generally indicated at 276. Said auxiliary section further includes a plurality of auxiliary section countershafts 278 and 280 each having an identical grouping of countershaft gears 284, 286 and 288 therein.

As is known in the art and is illustrated in above-mentioned U.S. Pat. No. 3,105,395, to minimize the axial and transverse dimensions of a twin countershaft-type compound transmission, the mainshaft section countershafts, 224 and 226, are displaced about 90° from the auxiliary section countershafts. Main section countershafts are supported in housing 216 by bearings 290 and 292 while auxiliary section countershafts 278 and 280 are supported in housing 216 by bearings 294 and 296.

Two auxiliary section mainshaft gears, 308 and 310, encircle the mainshaft 228 and are constantly meshed with and floatingly supported by the auxiliary countershaft gear pairs 284 and 286, respectively. Output gear 312 is splined to output shaft 274 for axial movement relative thereto and rotational movement therewith. Output gear 312 is constantly meshed with auxiliary countershaft gear pair 288.

Resiliently biased clutch members 316, 318 and 320 are splined to mainshaft 228 and, in combination with blockers (not shown) provide resilient, blocked clutching apparatus of the type described in above-mentioned U.S. Pat. Nos. 3,799,002, 3,921,469; 3,924,484 and 4,736,643 for selectively clutching gears 308, 310 and 312, respectively, one at a time, to mainshaft 228. Clutch 316 is biased axially by spring 330 and limited in its axial movement by positive stop 334. Clutch members 318 and 320 are biased axially apart by spring 138 surrounding the mainshaft and limited in axial movement by stops 338 and 340.

Gear 312 is axially moved by shift fork 342 and gears 308 and 310 are joined for joint axial movement and independent rotation by ring 346 and are axially movable by shift fork 348. Gears 308, 310 or 312 are selectively engaged, one at a time, to mainshaft 228. Of course, engagement of gear 312 to the mainshaft 228 is effective to couple mainshaft 228 directly to the output shaft 274.

Figure 5:
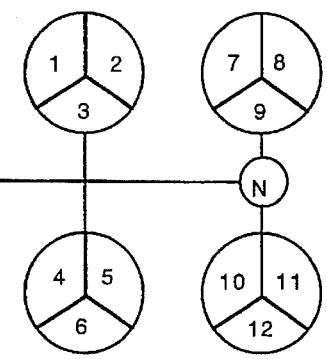
FIG. 5 illustrates the typical shift pattern for the transmission of FIG. 4.
Figure 6A:
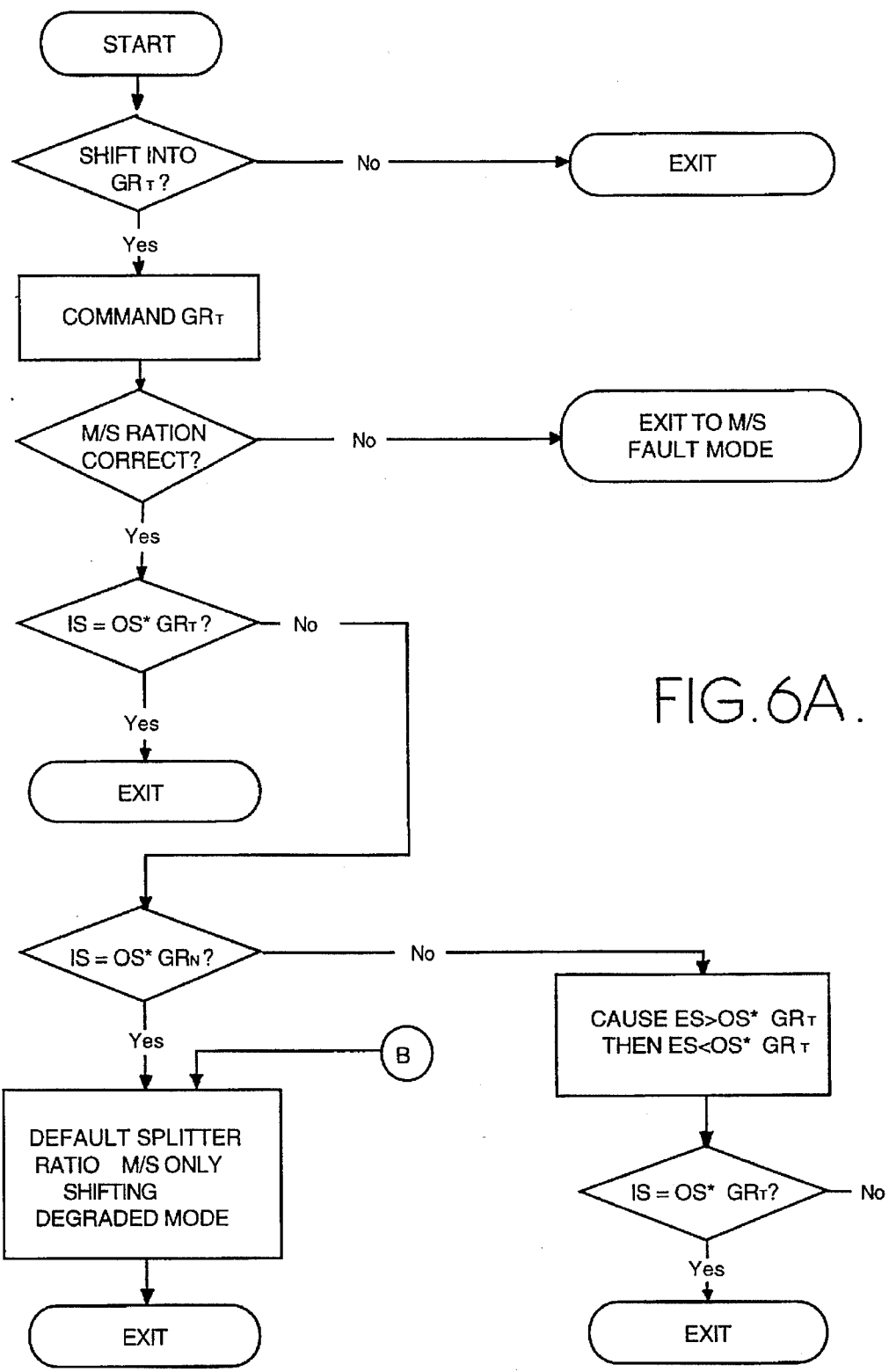
FIGS. 6A and 6B are symbolic representations, in flow chart format, of the shift control of the present invention.
Figure 6B:
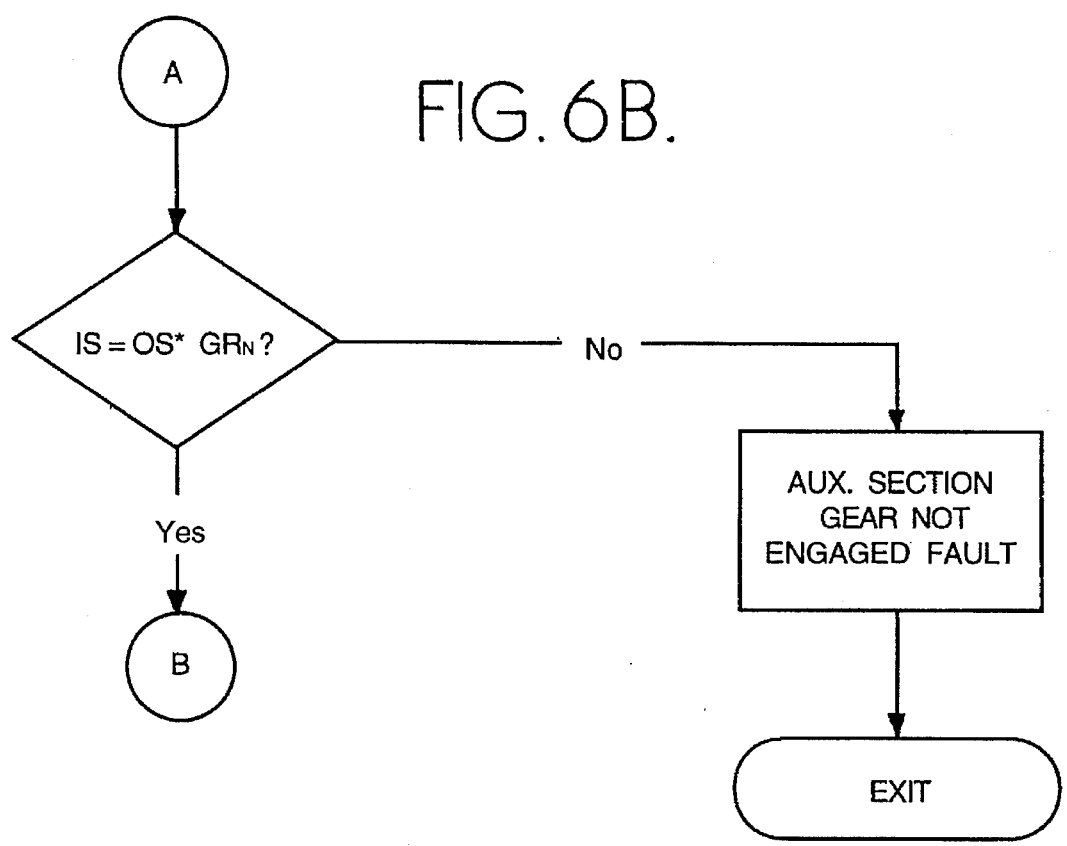

The shift pattern for transmission 12 is symbolically illustrated in FIG. 5.

The details of the blocked, resiliently biased clutch-blocker assembly of the present invention may be seen by reference to FIGS. 4A–4D.

The yieldable blocked jaw clutch structures are arranged between the shiftable mainshaft gears and the auxiliary section and are provided with resilient meansfor urging engagement thereof as set forth in detail in the above-mentioned U.S. Pat. Nos. 3,799,002; 3,924,484 and 3,983,979. While clutch means utilizing relatively nondeformable blockers of the prior art are not identical with each other, they are generally similar and hence insofar as the present invention is concerned, it will be sufficient to described only one of them in detail with the understanding that same may be applied to the other clutch units without difficulty by anyone skilled in the art. Therefore, for this purpose, referring to the positive jaw clutch unit positioned between the mainshaft gear 308 and the mainshaft 228 in the auxiliary transmission section 214, said jaw clutch unit is generally designated 356 and includes an annular clutch collar or clutch member 316 encircling the mainshaft 228. The clutch collar 316 is provided with internal splines 358 which are disposed within corresponding external splines 360 provided on the mainshaft 228 for interconnecting the clutch collar 316 to the mainshaft 228 for rotation therebetween. However, the cooperating splines 358 and 360 permit the clutch collar 316 to freely slide axially relative to the shaft 228. Other means for mounting clutch collar 316 to mainshaft 228 allowing relative axial but not rotational motion therebetween may be utilized. A stop ring 334 is seated within a suitable groove formed on the external periphery of the shaft 228 and is disposed for contacting the clutch collar 316 and limiting the rightward axial movement thereof. The collar 316 is normally resiliently urged by means of a spring 330 into a butting engagement with the stop ring 334.

The clutch collar 316 is provided with external teeth 362 thereon which are adapted to meshingly engage the internal teeth 364 provided on the mainshaft gear308. The internal teeth 364 form the other jaw clutch member of clutch assembly 356. The teeth 362 on the clutch collar 316 are tapered, as at 366 and in a similar manner the leading edge of the teeth 364 on the mainshaft gear 308 are similarly tapered at 368. The tapered conical surfaces each extend at an angle of preferably between 30° and 40° relative to the longitudinal axis of the mainshaft 228. The exact degree of taper, and the advantages, thereof, are explained in detail in U.S. Pat. No. 3,265,173. The other end of the spring 330 resiliently acts against a spring seat member 369 fixed to mainshaft 228.

A selected number, here three, of the teeth 362 are partially removed for permitting the presence of a blocking ring as hereinafter further described. Such partial removal leaves, however, an axially shortened or partially removed tooth 370 for cooperation with the blocking ring.

Referring now to the relatively nondeformable blockers; also called blocker rings, blocking rings and sensors; one thereof is indicated generally at 324, and comprises a ring encircling the clutch member 316 and has an appropriate number, here three pairs, of radially inward projections 372 and 374, which when properly positioned will mate with the external teeth above mentioned. The inward projections or teeth 384 and 376 are contoured at their sides to lie snugly against the adjacent ones of the teeth 362, are positioned to project into the spaces between a partially removed tooth 370 and the teeth 362 on each side thereof. Each pair of projections 372 and 374 are circumferentially of less dimension than the corresponding circumferential spaces defined by partially removing teeth 370 and thus blocker ring 324 may be rotated in either a limitedclockwise or counterclockwise direction relative to clutch member 316 from the position seen in FIG. 4B in which the space between teeth 372 and 374 aligns with partially removed tooth 370. Contact of either blocker tooth 372 or 374 by a clutch tooth 362 will limit such relative rotation and cause blocker 324 to rotate with clutch member 316. The space between the inwardly projecting teeth 372 and 374 is, however, of a clearance distance wider than the corresponding circumferential dimension of the tooth 370 so that when properly aligned at synchronism (or more accurately, when the relative speeds of the clutch components cross synchronism) the teeth 372 and 374 will straddle the tooth 370 and the clutch member 320 can move axially through but not past blocker ring 324 to effect engagement with its corresponding gear.

As may be seen, the end faces of the blocker teeth 372 and 374 are tapered as at 376 and 378. The end face of partially removed tooth 270 is also preferably provided with tapers to ramps 380 and 382 complementary with the tapers or ramps 178 and 180 on the blocker ring blocking teeth 372 and 374. The angles 383 of the ramps 376, 378, 380 and 382 is selected such that the blocking teeth and the partially removed teeth will remain in proper blocked position when the main transmission section 212 is engaged but will tend, under a contacting force, if an auxiliary section shift has been selected, to cause the blocker and clutch to assume a nonblocking position (by causing relative rotational movement of the clutch 316, blocker 324 and/or mainshaft 228) if the main transmission section is disengaged (i.e., in neutral). A ramp angle 382 of about 15°–25°, preferably about 20°, relative to a plan P normal to the axis of rotation of the mainshaft 226 has proven highly satisfactory for most known semi-blocked transmission structures.

As is described in greater detail by reference to abovementioned U.S. Pat. No. 3,924,484, the radially inner side of ring 324 may be provided with an inwardly directed groove 384 which receives an annual resilient ring 386 which is normally of slightly less internal diameter than the external diameter of the teeth 362 so that when the parts are in the assembled condition, ring 386 is distorted slightly outwardly thereby to exert a light but definite pressure against the external surface of said teeth 362. Inasmuch as the ring 386 fits loosely and only in light frictional contact with the walls of the groove 384, this effects a significant resistance to axial movement between the blocker ring 126 and the clutch ring 316 but only an insignificant resistance to relative rotative movement therebetween.

A suitable conical surface 388 projects radially outwardly from the blocker ring 324 and is positioned for engagement with a similar conical surface 390 on a radially inner wall of the gear 308. The axial drag above mentioned is sufficient that the rotative driving effect of the surface 390 onto the blocker 324 is much greater than whatever rotative resistance may exist between the blocker 324 and the clutch member 314. A stop ring 392 limits movement of the blocker 324 away front the conical surface 390 when the clutch ring 316 moves out of engagement (leftwardly in FIG. 4A).

As may be seen to engage a selected auxiliary section 214 ratio, the ratio must be preselected and then the associated sensor must be moved to a nonblocking position. This is accomplished in one of two ways; either the rotational speed of the mainshaft 228 is manipulated to cause a reversal of the relative rotation of the clutch members (i.e., a crossing of synchronous) or the mainsection is shifted into neutral, lowering the inertia on the mainshaft 228 which allows the sensor unblocking ramps, 376 and 378, to rotate the mainshaft to a nonblocking position.

The latter method, described in detail in above-mentioned U.S. Pat. No. RE 32,591, is very satisfactory for most situations. However, under certain conditions, the blocker may not clock back to the non-blocking relative position thereof, which will undesirably prevent engagement of the preselected jaw clutch assembly. To alleviate this problem (called "blocker hang-up"), normally an upshift problem, it is usually necessary to engage the engine and master clutch and achieve synchronous or greater speed of the input shaft (i.e., IS=>OS * GR) to unblock the clutch assembly and allow jaw clutch engagement thereof.

As is known, a transmission ratio (GR) for transmission 12 is defined by a main section (212) ratio multiplied by an auxiliary section (214) ratio. According to the shift control of the present invention, upon a selection of a shift to a target ratio, the main section (212) is preferably shifted to neutral, the blocked jaw clutch assembly associated with the required splitter ratio in the splitter section (214) is preselected and then the appropriate main section ratio is engaged, using throttle blip and/or engine braking as necessary. Engagement of the main section in the desired main section ratio may be reliably sensed by position sensors 34A. However, position sensors, if any, associated with the auxiliary section actuator will only indicate a preselected position, not necessarily an engaged position, of the selected auxiliary section clutch assembly.

By way of example, a shift from sixth (6th) to seventh (7th) will require clutch 258 disengaging gear 248 from mainshaft 228, disengaging clutch 320 and preselecting clutch 316 in the auxiliary section 214 and then engaging gear 246 to the mainshaft 228 by clutch 260. It is expected that preselected clutch 316 will engage splitter gear 308 to the mainshaft under the action of the sensor unblocking ramps as the mainshaft is at a relatively low inertia while in neutral. As indicated above, an input signal indicative of the axial position of shift fork 266 and/or jaw clutch 260 is a reliable indication of engaged or not engaged condition of gear 246 while signals, if any, indicative of the axial positioning of shift fork 348 and/or gear 308 are only indicative of preselection of engagement of gear 308 to mainshaft 228 by blocked jaw clutch 316.

According to the shift control method/system of the present invention, a technique is provided to confirm engagement of a target ratio, to take corrective action if non-engagement of the target ratio is simply a blocker hang-up and, if this corrective action is not effective, to implement engagement fault degraded modes of operation.

Upon preselecting the required splitter section ratio and then engaging the required main section ratio and confirming such main section engagement, such as by position sensors 34A, engagement of the target ratio is determined by sensing if IS=(OS * $GT_T$)±K where:

IS=input shaft speed;
OS=output shaft speed;
$GT_T$=target gear ratio; and
K=an error tolerance for noise and the like.

Preferably, the error tolerance is about 50–150 RPM.

If the speed difference (IS–(OS * $GR_T$)) exceeds K, and the required main section ratio is engaged, then the selected auxiliary section splitter ratio is not engaged.

Upon sensing that the selected target ratio is not engaged, the logic will first check to determine if any valid ratio is engaged, i.e., does IS/OS=GR for any known ratio for a sustained period of time? Upon determining that a known ratio other than the target ratio is engaged, the splitter ratio associated with the engaged ratio will become the default splitter ratio and thereafter a fault degraded mode of operation where only main section shifting occurs will be implemented. By way of example, if the target ratio is eighth (8th) and IS/OS shows seventh (7th) is engaged, then the system will command to shift into seventh (7th) again, and once the shift has completed, the current splitter ratio will be locked (i.e., other splitter ratios will not be available because there may be mechanical failures in the splitter unit). In this particular scenario, splitter 1 (low splitter) will be the default ratio and the available gears will be 1R, N, 1, 4, 7 and 10 (main box shift only).

If the transmission is not engaged in any ratio, and the main section is engaged in a known main section ratio, this means that the splitter section is not engaged.

Upon sensing that the auxiliary section is not engaged, corrective action is taken to alleviate the most likely cause of the fault, namely blocker hang-up of the preselected blocked clutch assembly associated with the desired splitter section ratio.

To correct the suspected hung-up blocked clutch assembly problem, the engine is fueled with the main section and the master clutch remaining engaged to cause the input shaft rotational speed to equal or exceed the synchronous speed thereof (i.e., $IS \geq OS * GR_T$) and then the engine is defueled to cause input speed to be below synchronous speed, which will cause the suspected hung-up blocked jaw assembly to pass through synchronous, which should knock the blocker off the blocked position thereof. This routine is rather quick and does not require a recycling of the complete shift routine.

Upon completion of this corrective technique, the controller will again test for engagement of the target ratio by means of the relationship $IS=(OS * GR_T)+K$. If the speed difference is less than K, no further action is required and the engagement fault subroutine is exited. If the corrective action does not cause verified engagement of the target ratio, the logic will again check for engagement of any known ratio as indicated above. If a known ratio is not engaged, the system will recycle attempts to engage another splitter section ratio until the vehicle comes to a stop. If another splitter section ratio is engaged, that ratio will become the default splitter section ratio in a main-section-shifting-only degraded mode of operation as discussed above.

Accordingly, it may be seen that a control is provided for an automated, compound, semi-blocked, splitter-type transmission which will attempt to recover from a sensed nonengaged splitter section fault by maintaining the master clutch and main section engaged while increasing fueling to cause the input shaft to rotate at at least the synchronous speed thereof ($IS=OS * GR_T$) and then decreasing fueling to cause the blocked jaw clutch members to pass through synchronous, which should correct a hung-up condition of the preselected blocked clutch assembly.

Although the preferred embodiment of the present invention has been described with a certain degree of particularity, various changes to form and detail may be made without departing from the spirit and the scope of the invention as hereinafter claimed.

We claim:

1. A control method for an automated mechanical transmission system comprising a fuel-controlled engine and a compound splitter-type constant-mesh, change-gear transmission comprising a main transmission section and a splitter-type blocked auxiliary transmission section connected in series thereto, said main section including sensors for providing input signals indicative of the engaged state of said main section, said transmission defining a plurality of known transmission ratios, each defined by a unique combination of engagement of a particular main section ratio and a particular auxiliary section ratio, said system further comprising main section and auxiliary section shifting means, a central processing unit (i) for receiving input signals, (ii) for determining a desired transmission ratio by processing said input signals in accordance with a program, and (iii) for generating command output signals to said shifting means, said processing unit commanding all nondirectional changes in transmission ratio into a target ratio ($GR_T$) in the sequence comprising first commanding shifting of the main transmission section to neutral, then commanding a shift in the auxiliary transmission section to engage a required auxiliary section ratio and thereafter commanding a shift in the main transmisison section to engage a required one of the main section ratios, said method comprising the steps of, upon completion of commanding engagement of the main section into the required ratio thereof:

(a) confirming engagement of the main section in the required ratio thereof;

(b) then, sensing for confirmation of engagement of the transmission in the target ratio;

(c) if the transmission is not in the target ratio, then sensing for confirmation of engagement of the transmission in any transmission ratio;

(d) then, if the transmission is not confirmed as engaged in any ratio, maintaining the main section engaged and causing engine speed to increase to equal or exceed the synchronous engine speed for the target gear ratio, and then causing engine speed to decrease to less than the synchronous engine speed; and (e) then, sensing for confirmation of engagement of the transmission in the target gear ratio.

2. The method of claim 1 additionally comprising, after step (e), (f) if the transmission is not in the target ratio, then sensing for confirmation of engagement of the transmission in any transmission ratio.

3. The method of claim 1 wherein said transmission includes an input shaft and an output shaft, said input signals include signals indicative of the rotational speed of said input shaft (IS) and of said output shaft (OS), and engagement is sensed when $IS=(OS * GR)+K$, where:

GR is a numerical gear ratio, and

K is a tolerance factor.

4. The method of claim 3 wherein the value of K is about 50–150 RPM.

5. A control system for an automated mechanical transmission system comprising a fuel-controlled engine, an engine speed sensor and a compound splitter-type constant-mesh, change-gear transmission comprising a main transmission section and a splitter-type blocked auxiliary transmission section connected in series thereto, said main section including sensors for providing input signals indicative of the engaged state of said main section, said transmission defining a plurality of known transmission ratios, each defined by a unique combination of engagement of a particular main section ratio and a particular auxiliary section ratio, said system further comprising main section and auxiliary section shifting means, a central processing unit (i) for receiving input signals, (ii) for determining a desired transmission ratio by processing said input signals in accordance with a program, (iii) for comparing sensed engine speed to synchronous engine speed for engaging a target gear ratio, and (iv) for generating command output signals to said shifting means, said processing unit commanding all nondirectional changes in transmission ratio into a target ratio ($GR_T$) in the sequence comprising first commanding shifting of the main transmission section to neutral, then commanding a shift in the auxiliary transmission section to engage a required auxiliary section ratio and thereafter commanding a shift in the main transmisison section to engage a required one of the main section ratios, said control system characterized by means, effective upon completion of commanding engagement of the main section into the required ratio thereof, for:

(a) confirming engagement of the main section in the required ratio thereof;

(b) then, sensing for confirmation of engagement of the transmission in the target ratio;

(c) if the transmission is not in the target ratio, then sensing for confirmation of engagement of the transmission in any transmission ratio;

(d) then, if the transmission is not confirmed as engaged in the target ratio, maintaining the main section engaged and causing engine speed to increase to equal or exceed the synchronous engine speed for the target gear ratio, and then causing engine speed to decrease to less than the synchronous engine speed; and (e) then, sensing for confirmation of engagement of the transmission in the target gear ratio.

6. The control system of claim 5 wherein said transmission includes an input shaft and an output shah, said input signals include signals indicative of the rotational speed of said input shaft (IS) and of said output shaft (OS), and engagement is sensed when IS=(OS * GR)+K, where:

GR is a numerical gear ratio, and

K is a tolerance factor.

7. The control system of claim 6 wherein the value of K is about 50–150 RPM.

* * * * *